United States Patent
Declercq et al.

(10) Patent No.: US 8,539,474 B2
(45) Date of Patent: Sep. 17, 2013

(54) METHOD AND SYSTEM FOR MANAGEMENT OF INTERIM SOFTWARE FIXES

(75) Inventors: Andrew J. Declercq, Austin, TX (US); Cheryl L. Hall, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1387 days.

(21) Appl. No.: 11/536,066

(22) Filed: Sep. 28, 2006

(65) Prior Publication Data

US 2008/0098382 A1    Apr. 24, 2008

(51) Int. Cl.
*G06F 9/44*    (2006.01)

(52) U.S. Cl.
USPC .................. 717/170; 717/168; 717/173

(58) Field of Classification Search
None
See application file for complete search history.

(56) References Cited

U.S. PATENT DOCUMENTS

| | | | | |
|---|---|---|---|---|
| 5,481,713 A * | 1/1996 | Wetmore et al. | ............... | 717/170 |
| 5,537,596 A * | 7/1996 | Yu et al. | ............... | 717/168 |
| 5,644,771 A * | 7/1997 | Endicott et al. | ............... | 717/170 |
| 5,673,390 A * | 9/1997 | Mueller | ............... | 714/57 |
| 5,694,540 A * | 12/1997 | Humelsine et al. | ............... | 714/38.1 |
| 5,732,275 A * | 3/1998 | Kullick et al. | ............... | 717/173 |
| 5,781,720 A * | 7/1998 | Parker et al. | ............... | 714/38.11 |
| 5,794,043 A * | 8/1998 | Kolb | ............... | 717/124 |
| 6,138,112 A * | 10/2000 | Slutz | ............... | 707/748 |
| 6,154,878 A * | 11/2000 | Saboff | ............... | 717/173 |
| 6,170,065 B1 * | 1/2001 | Kobata et al. | ............... | 714/7 |
| 6,199,203 B1 * | 3/2001 | Saboff | ............... | 717/168 |
| 6,205,579 B1 * | 3/2001 | Southgate | ............... | 717/173 |
| 6,266,810 B1 * | 7/2001 | Tanaka et al. | ............... | 717/173 |
| 6,421,778 B1 * | 7/2002 | Wood et al. | ............... | 717/168 |
| 6,493,871 B1 * | 12/2002 | McGuire et al. | ............... | 717/173 |
| 6,610,103 B2 * | 8/2003 | Ehrman et al. | ............... | 715/256 |
| 6,634,026 B1 * | 10/2003 | Jones | ............... | 717/170 |
| 6,763,517 B2 * | 7/2004 | Hines | ............... | 717/124 |
| 6,826,558 B2 * | 11/2004 | Slutz | ............... | 1/1 |
| 7,051,319 B1 * | 5/2006 | Thorson et al. | ............... | 717/122 |
| 7,076,496 B1 * | 7/2006 | Ruizandrade | ............... | 717/170 |
| 7,076,778 B2 * | 7/2006 | Brodersen et al. | ............... | 717/170 |

(Continued)

OTHER PUBLICATIONS

Robert Ericson et al., "A View of Reliability and Quality Measurements for Telecommunications Systems", IEEE, 1990, <http://ieeexplore.ieee.org/stamp/stamp.jsp?tp=&arnumber=46875> pp. 1-5.*

(Continued)

*Primary Examiner* — Thuy Dao
*Assistant Examiner* — Samuel Hayim
(74) *Attorney, Agent, or Firm* — Cantor Colburn LLP; Libby Toub (57) ABSTRACT

A method of organizing interim software fixes is disclosed. The method includes communicating with a user to understand a first software operation problem and determining if a first interim software fix to remedy the first software operation problem exists within an archive comprising a plurality of interim software fixes. In response to determining the first interim software fix exists, making available to the user an electronic package for installing the first interim software fix to remedy the first software operation problem. In response to determining the first interim software fix does not exist, causing to be developed the first interim software fix to remedy the first software operation problem. The method further includes creating an electronic package for the first interim software fix, making available to the user the electronic package for the first interim software fix and storing information associated with the first software operating problem in the archive.

10 Claims, 2 Drawing Sheets

(56) References Cited

U.S. PATENT DOCUMENTS

| | | | |
|---|---|---|---|
| 7,689,972 B2* | 3/2010 | Sah et al. | 717/124 |
| 2001/0056441 A1* | 12/2001 | Ehrman et al. | 707/511 |
| 2003/0046029 A1* | 3/2003 | Wiener et al. | 702/186 |
| 2004/0060044 A1* | 3/2004 | Das et al. | 717/171 |
| 2004/0107416 A1* | 6/2004 | Buban et al. | 717/170 |
| 2004/0158817 A1* | 8/2004 | Okachi et al. | 717/122 |
| 2004/0167976 A1* | 8/2004 | Peer | 709/223 |
| 2004/0168165 A1* | 8/2004 | Kokkinen | 717/168 |
| 2004/0226008 A1* | 11/2004 | Jacobi et al. | 717/168 |
| 2005/0066233 A1* | 3/2005 | Day et al. | 714/38 |
| 2005/0102653 A1* | 5/2005 | Henderson et al. | 717/126 |
| 2005/0114362 A1* | 5/2005 | Colleran et al. | 707/100 |
| 2006/0101443 A1* | 5/2006 | Nasr | 717/163 |
| 2006/0107260 A1* | 5/2006 | Motta | 717/170 |
| 2006/0218545 A1* | 9/2006 | Taguchi | 717/168 |

OTHER PUBLICATIONS

Syed Riffat Ali , "Software Patching in the SPC Environment and its Impact on Switching System Reliability" , IEEE , 1991 , <http://ieeexplore.ieee.org/stamp/stamp.jsp?tp=&arnumber=81958> pp. 1-6.*

Joseph Dadzie , "Understanding Software Patching" , ACM , 2005 , <http://delivery.acm.org/10.1145/1060000/1053343/p24-dadzie.pdf> pp. 1-7.*

* cited by examiner

FIG. 1

METHOD AND SYSTEM FOR MANAGEMENT OF INTERIM SOFTWARE FIXES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to temporary software fixes, and particularly to management of temporary software fixes.

2. Description of Background

Users of large, sophisticated computing systems may prefer to avoid incorporating significant upgrades, or version changes, to the operating system software of such systems. Significant version changes can create a large disruption in the service of the applications installed on systems, provide the potential for additional, unexpected difficulties, and may lack the ability to fully support applications designed for the previous version. Furthermore, such users, upon discovering an issue with an installed application, may request temporary solutions that directly address the discovered issues before a permanent fix, as part of an upgrade, is available for distribution. Accordingly, such users may prefer temporary, direct solutions over general system upgrades that change the overall software version.

It may occur that users of software applications, or programs, will encounter the situation in which installation of a first temporary fix that effects a certain file results in another issue that requires a second fix that effects the same file, such as kernel fixes in an operating system, for example. It may also occur that the user will encounter a second issue, entirely unrelated to the first, which will also need to be corrected in the already patched file. It may be that the source code and the binary files related to the first fix are not available, resulting in extensive consultation to determine what was provided in the first fix and to duplicate the code changes provided therein. Accordingly there is a need in the art for an interim fix management arrangement that overcomes these drawbacks.

SUMMARY OF THE INVENTION

The shortcomings of the prior art are overcome and additional advantages are provided through the provision of a method to archive and manage temporary, or interim, fixes to software programs.

An embodiment of the invention includes a method of organizing interim software fixes. The method begins with communicating with a user to understand a first software operation problem, creating a problem management record including an identity of the user, information relating to an exact version of a software program experiencing the first software operation problem, and information relating to the first software operation problem, and determining if a first interim software fix to remedy the first software operation problem exists within an archive comprising a plurality of interim software fixes. In response to determining that the first interim software fix exists, making available to the user an electronic package for installing the first interim software fix to remedy the first software operation problem.

In response to determining that the first interim software fix does not exist, causing to be developed, the first interim software fix including a set of source code to remedy the first software operation problem, in conjunction with a backing tree for defining the exact version of the software program used by the user. The method proceeds with creating an electronic package for the first interim software fix, making available to the user the electronic package for the first interim software fix; and storing information associated with the first software operating problem in the archive.

Another embodiment of the invention includes a method of organizing interim software fixes. The method begins with communicating with a user to understand a first software operation problem, creating a problem management record including an identity of the user, information relating to an exact version of a software program experiencing the first software operation problem, and information relating to the first software operation problem, and determining if a first interim software fix to remedy the first software operation problem exists within an archive comprising a plurality of interim software fixes. In response to determining that the first interim software fix exists, making available to the user an electronic package for installing the first interim software fix to remedy the first software operation problem.

In response to determining that the first interim software fix does not exist, causing to be developed, the first interim software fix including a set of source code to remedy the first software operation problem, in conjunction with a backing tree for defining the exact version of the software program used by the user. The method proceeds with creating an electronic package for the first interim software fix, making available to the user the electronic package for the first interim software fix, and storing information associated with the first software operating problem in the archive.

The method further includes determining that a second software operating problem results from the first interim software fix, developing a second interim software fix including a set of source code to remedy the second software operation problem in conjunction with the backing tree that defines the exact version of software used by the user, and creating an electronic package for the second interim software fix.

The method concludes with making available to a plurality of users, to whom the electronic software package for the first interim software fix was made available, the electronic software package for the second interim software fix, storing information associated with the second software operating problem in the archive, and creating a link between the information associated with the first software operating problem and the information associated with the second software operating problem to advise of the second software operating problem resulting from the first interim software fix.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which can increase consistency and quality of interim software fixes, reduce total response time to provide interim software fixes, and eliminate duplicate efforts by software developers to create interim software fixes.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

An embodiment of the invention will provide an archiving method for storing interim fixes to a software program, the associated source code changes, backing tree information, and any other information to allow the fix to be subsequently identified. In an embodiment, the method for storing interim fixes will allow a first fix to be easily identified and updated when the first fix is found to contain an unexpected issue. In an embodiment, when the user discovers a subsequent issue and requires a fix package that contains multiple fixes, the source code for each fix is available in the archive, and can be conveniently extracted and combined with new code to produce a composite fix. In an embodiment, where the first fix is found to contain an unexpected issue, the archive method allows it to be marked as deprecated. Both a new fix and the deprecated fix contain references to the other so that the entire history of the temporary fix is available. In an embodiment, because a list of customers to whom the deprecated fix was provided is available, customers who received the deprecated fix can be quickly notified and supplied with the new, or replacement, fix. As used herein, the term "user" shall refer to any party that is interested to ensure expected performance of the software program, such as users of the software program, purchasers of the software program, and information technology personnel responsible to assist such software users, for example.

Figure 1:
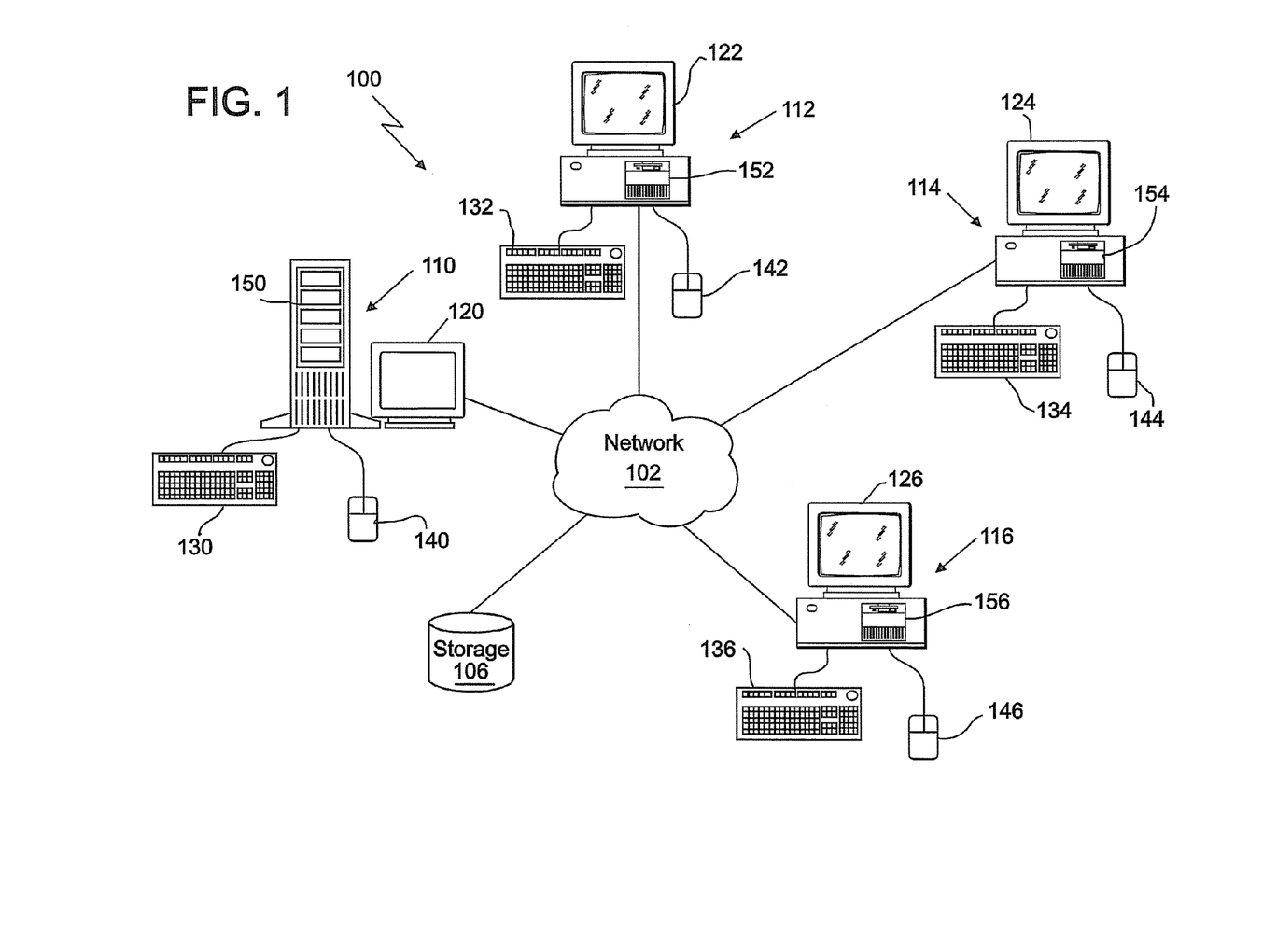
FIG. 1 illustrates one example of an electronic archive system in accordance with an embodiment of the invention.

With reference now to the figures, and in particular, with reference to FIG. 1, a pictorial representation of an electronic archive system 100 in which the present invention may be implemented is depicted. The electronic archive system 100 is configured to store and make available an archive, or history of interim software fixes.

The electronic archive system 100 includes a network 102, which is the medium used to provide communication links between various devices and computers connected together within the electronic archive system 100. The network 102 may include permanent connections, such as wire or fiber optic cables, temporary connections made through telephone connections, or wireless connections, for example.

In the depicted example, computers 110-116 are each connected to the network 102 and are configured to communicate via the network 102. Computer 110 represents a central storage location, such an archive server configured to store an archive, or history of a plurality of interim software fixes. Computers 112-116 are archive clients configured to retrieve, create, and edit the archive history of any of the plurality of interim software fixes. The archive clients 112-116 may be, for example, personal computers or network computers. The electronic archive system 100 may include additional computers, such as servers, and clients, for example, and other devices not shown. A storage device 106 may be used to store and retrieve data associated with the archive history of the plurality of interim software fixes.

In an example, the electronic archive system 100 includes the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, the electronic archive system 100 may also be implemented as a number of different types of networks 102, such as an Intranet or a local area network, for example.

Each archive server 110 and archive client 112-116 within the electronic archive system 100 may have a program storage device 150-156 to store system, data, and application files. Output devices, such as CRT display screens 120-126, are configured to display interim software fix archive history information, for example, and input devices, such as keyboards 130-136, and mice 140-146, for example, are configured to enter text to create and edit interim software fix archive history information, for example. In an embodiment, each archive client 112-116 is configured to communicate with the archive server 110 via the network 102.

While an embodiment of the invention has been described using keyboards 130-136 and mice 140-146 as input devices, and CRT display screens 120-126 as output devices to display, create, and edit interim software fix archive history information, it will be appreciated that the scope of the invention is not so limited, and that the invention also applies to electronic archive systems 100 that may utilize alternate input and output devices, such as writing tablets, voice recognition, and audio speakers, for example.

While an embodiment of the invention has been depicted with four computers linked together via a common network for the purposes of archiving a history of interim software fixes, it will be appreciated that the scope of the invention is not so limited, and that the invention will also apply to other arrangements of computers or other electronic devices connected together, such as many more computers linked together, via one network in signal communication with another network of computers that may located as far apart as to be on different continents, for example.

FIG. 1 is intended as an example, and not as an architectural limitation for the processes of the present invention.

In an embodiment, the user of a software program may discover an issue (also herein referred to as a problem), or that the program does not perform as expected. For example, the program may result in a crash of the system on which the program is running. As is common in the art, solutions for known problems are often developed and made available to users via distribution of system version upgrades. However, in some cases, the user may require a solution to the issue before the version upgrade is made available. Further, some users may be hesitant to deploy full upgrades, and prefer an interim fix developed specifically to address only the discovered issue.

In an embodiment, in response to a user-initiated assistance request, a customer service representative will communicate with the user to understand a first software operation problem. Using an archive client 112-116, the customer service representative will create a problem management record. The problem management record will include information related to the first software operation problem experienced by the user, information to assist a software developer in developing the interim fix, as well as other information to assist in subsequent retrieval and examination of the problem, such as an identity of the user, information relating to an exact version of a software program experiencing the first software operation problem, and information relating to the first software operation problem.

While an embodiment of the invention has been described using a customer service representative to communicate with the user to understand the first software operation problem, it will be appreciated that the scope of the invention is not so limited, and that the invention will also apply to archive systems that may use other means to communicate with the user to understand the first software operation problem, such as software developers, and automated software programs configured to diagnose software operation problems, for example.

Following the creation of the problem management record relating to the first software operation problem, the customer service representative will proceed by determining if a first interim software fix to remedy the first software operation problem experienced and reported by the user exists within the archive that includes a plurality of interim software fixes. In an embodiment, the determining if the first interim software fix exists will be performed by searching a plurality of other problem management records, for example, that may be stored upon the archive server 110, via any of the archive clients 112-116.

In response to determining that the first interim software fix exists within the archive of interim software fixes, and that it was developed for the exact version of the software program experiencing the first software operation problem, the customer service representative will download from the archive server 110 an electronic package (in a state that is ready for use by the user), configured to replace any files and execute any commands necessary to install the first interim software fix upon the computer system of the user. If the first interim software fix exists within the archive, but was developed for a different version of the software program reported by the user to be experiencing the first software operation problem, a new electronic package will be created from a set of source code stored within the archive, as described further below, for the version of the software program reported by the user to be experiencing the first software operation problem. The customer service representative will then proceed by making available to the user the electronic package for installing the first interim software fix to eliminate, or at least remedy, the first software operation problem. It will be appreciated that the electronic package may be made available to the user via any variety of methods, such as email, file transfer protocol, or physical delivery of electronic media, such as a CD-ROM, for example.

While an embodiment of the invention has been described searching a plurality of other problem management records to determine if a interim software fix exists within the archive, it will be appreciated that the scope of the invention is not so limited, and that the invention will also apply to electronic archive systems 100 that may determine if an interim software fix exists within the archive by other means, such as querying the archive, for example.

In an embodiment, in response to determining that the first interim software fix does not exist, the customer service representative will make available to the software developer information associated with the problem management record. The software developer will then refer to the information included within the problem management record to begin developing the first interim software fix, which will include a set of source code configured to eliminate, or at least remedy, the first software operation problem. To simplify the development of the first interim software fix, the software developer will utilize a backing tree for defining the exact version of the software program used by the user. The backing tree is a file organization system that includes components of multiple release versions of the software program, and allows the software developer to create the first software fix for a variety of different releases. The developer can combine the appropriate components to create a duplicate of the version used by the user, as well as a plurality of versions, without having to utilize a complete copy of each of the plurality of versions.

While an embodiment of the invention has been described using a software developer to develop an interim fix for the software operation problem, it will be appreciated that the scope of the invention is not so limited, and that the invention will also apply to archive systems that may use other means to develop an interim fix for the software operation problem, such as an automated software program configured to develop interim fixes for software operation problems, for example.

In an embodiment, following the development of the first interim software fix, the developer will store the first interim software fix in the archive on the archive server 110 via one of the archive clients 112-116. The customer service representative will then, using at least one of the archive server 110 and one of the archive clients 112-116, create the electronic package for the first interim software fix, and make available to the user the electronic package for the first interim software fix. An embodiment will include storing, within the archive on the archive server 110, information associated with the first software operating problem, including the electronic package for the first interim software fix, information relating to the corresponding backing tree, the set of source code to remedy the first software operating problem, and a set of identification numbers that allow the first interim software fix to be uniquely identified. In an embodiment, the set of identification numbers for internal use are known as "defect numbers". In an embodiment, the set of identification numbers for external use are known as authorized program analysis report (APAR) numbers. In an embodiment, the information associated with the first software operating problem will further include information relating to the testing performed to ensure adequate operation of the first interim software fix. In an embodiment, the information associated with the first software operating problem will further include prerequisite information relating to required release version information of the software program for successful installation of the first interim software fix.

In an embodiment, it may occur that the first interim software fix, while providing a solution to the first software operating problem, may be the unintended cause of a different, second software operating problem. As described above, the customer service representative will communicate with the user to understand the second software operation problem, and create the problem management record including information associated with the second software operating problem. If the customer service representative, subsequent to determining that a second interim software fix, to solve the second software operating problem for the exact version of the software program, exists, they will download it from the archive server 110, and make available to the user the electronic package for installing the second interim software fix. In an embodiment, the determining if the second interim software fix exists will be performed by searching a plurality of other problem management records, for example, that may be stored upon the archive server 110, via any of the archive clients 112-116.

In an embodiment, similar to the description above regarding the first interim software fix, in response to determining that the second interim software fix does not already exist, the software developer will begin to use one of the archive server 110 and any of the archive clients 112-116 for developing the second interim software fix including a set of source code to eliminate, or at least remedy, the second software operation problem in conjunction with the backing tree that defines the exact version of software used by the user.

In an embodiment, following developing the second interim software fix, the developer will store the second interim software fix in the archive on the archive server 110. The customer service representative will then, using at least one of the archive server 110 and any of the archive clients 112-116, create the electronic package for the second interim software fix, and make available to the user the electronic package for the second interim software fix. In an embodiment, one of the customer service representative and the software developer will store, within the archive on the archive server 110, via any of the archive clients 112-116, information associated with the second software operating problem, including the electronic package for the second interim software fix, information relating to the corresponding backing tree, the set of source code to remedy the second software operating problem, and a set of identification numbers that allow the second interim software fix to be uniquely identified. In an embodiment, the information associated with the second software operating problem will further include information relating to the testing performed to ensure adequate operation of the second interim software fix. In an embodiment, the information associated with the second software operating problem will further include prerequisite information relating to required release version information of the software program for successful installation of the second interim software fix. In an embodiment, one of the customer service representative and the software developer will use one of the archive server 110 and any of the archive clients 112-116 to create a link between the information associated with the first software operating problem and the information associated with the second software operating problem, so that any subsequent queries on either of the operating problems will advise of the relationship of the second operating problem resulting from the first interim software fix.

An embodiment of the invention will include making available to a plurality of users to whom the electronic software package for the first interim software fix was made available, the electronic software package for the second interim software fix, to remedy the second software operating problem that may be created by the first interim software fix.

It will be appreciated that, depending upon the specific hardware configuration, operating system release version, and applications installed upon the computer system used by the user, a third software operating problem may be encountered that includes all of the symptoms of the first software operating problem, as well as an additional software operating problem. Accordingly, it will be appreciated that efficiency of responding to the third software operating problem will be enhanced by retrieving from the archive server 110 and incorporating into a third interim software fix, to solve the third software operating problem, the source code developed to solve the first software operating problem.

In an embodiment, one of the customer service representative and the software developer will determine that the third software operating problem includes the first software operating problem as well as the additional software operating problem. In an embodiment, the software developer will proceed to develop a set of source code to eliminate, or at least remedy, the additional software operating problem in conjunction with the backing tree that defines the exact version of software used by the user. In an embodiment, one of the customer service representative and the software developer will utilize any of the archive clients 112-116 to combine the set of source code stored on the archive server 110 to eliminate, or at least remedy, the additional software operating problem with the set of source code to eliminate, or at least remedy, the first software operating problem, thereby remedying the third software operating problem experienced by the user. The customer service representative will then proceed to use any of the archive clients 112-116 for creating the electronic package for the third interim software fix, and make available to the user the electronic package for the third interim software fix. An embodiment will include storing, within the archive on the archive server 110, information associated with the third software operating problem, including the electronic package for the third interim software fix, information relating to the corresponding backing tree, the set of source code to remedy the third software operating problem, and a set of identification numbers that allow the third interim software fix to be uniquely identified. In an embodiment, the information associated with the third software operating problem will further include information relating to testing performed to ensure adequate operation of the third interim software fix. In an embodiment, the information associated with the third software operating problem will further include prerequisite information relating to required release version information of the software program for successful installation of the third interim software fix.

Figure 2:
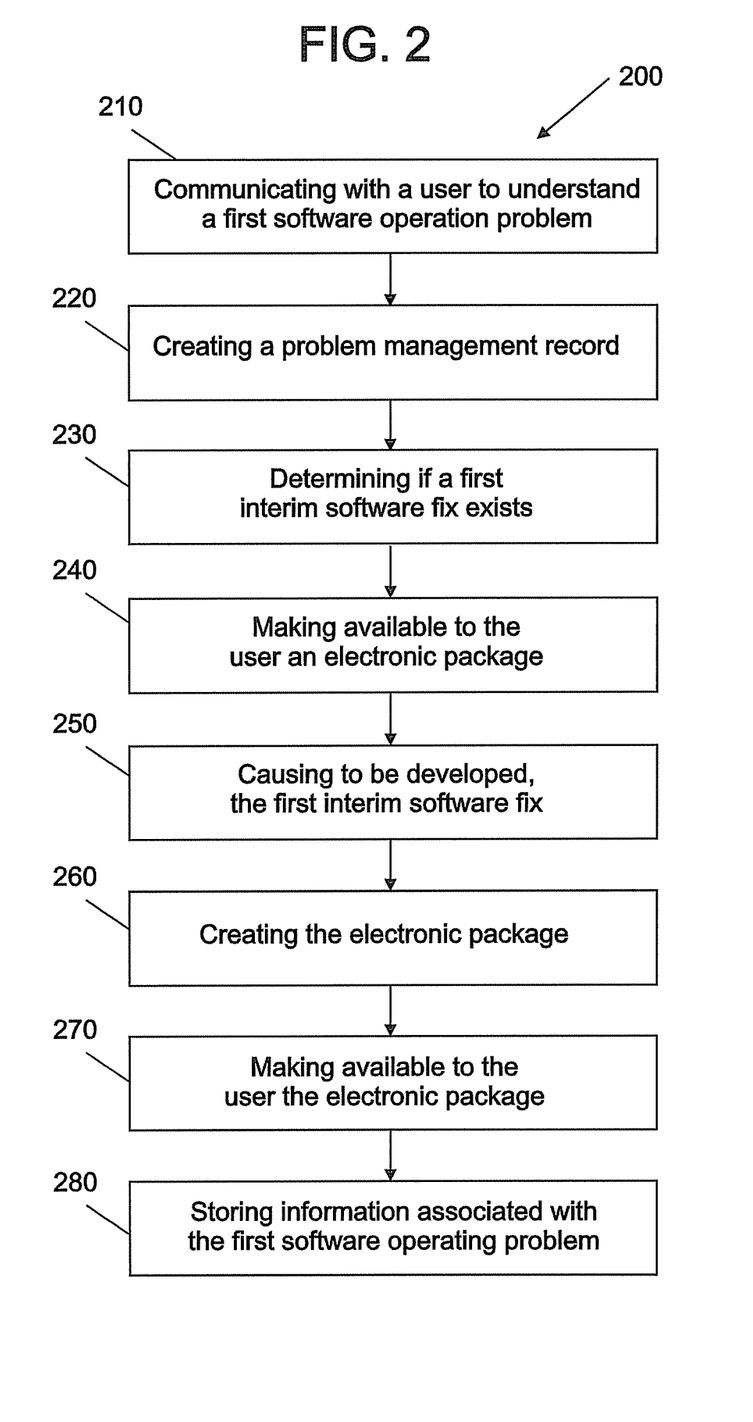
FIG. 2 illustrates one example of a flow chart of a method for organizing interim software fixes in accordance with an embodiment of the invention.

In view of the foregoing, the electronic archive system 100 performs the method of organizing interim software fixes. Referring now to FIG. 2, a flowchart 200 of an exemplary embodiment of the method of organizing interim software fixes is depicted.

The method begins in response to the user-initiated assistance request, by communicating 210 with the user to understand the first software operation problem, and creating 220 the problem management record including the identity of the user, information relating to the exact version of the software program experiencing the first software operation problem, and information relating to, or describing the observed unexpected behavior created by, the first software operation problem.

The method proceeds with determining 230 if the first interim software fix to remedy the first software operation problem, exists within the archive including the plurality of interim software fixes by searching, for example, the plurality of problem management records. In response to determining that the first interim software fix, for the exact version of the software program exists, the method proceeds with making available 240 to the user the electronic package for installing the first interim software fix to eliminate, or at least remedy, the first software operation problem.

In response to determining that the first interim software fix to eliminate, or at least remedy, the first software operation problem does not exist, the method will proceed with causing to be developed, 250 the first interim software fix including the set of source code to eliminate, or at least remedy, the first software operation problem in conjunction with the backing tree for defining the exact version of the software program used by the user, creating 260 the electronic package for the first interim software fix, and making available 270 to the user the electronic package for the first interim software fix. The method concludes with storing 280 information associated with the first software operating problem in the archive, thereby allowing subsequent occurrences, or similar variations, of the first software operating problem to be efficiently addressed.

In an embodiment, the storing information associated with the first software operating problem in the archive includes storing the electronic package for the first interim software fix, information relating to the corresponding backing tree, the set of source code to remedy the first software operating problem, and the set of identification numbers that allow the first interim software fix to be uniquely identified. In an embodiment, the storing the set of identification numbers include storing "defect numbers", that are used to internally identify the first interim software fix. In an embodiment, storing the set of identification numbers include storing APAR numbers that are available for external use to identify the first interim software fix.

In an embodiment, the method further includes determining that the second software operating problem results from the first interim software fix, developing the second interim software fix comprising the set of source code to eliminate, or at least remedy, the second software operation problem in conjunction with the backing tree that defines the exact version of software used by the user, and creating the electronic package for the second interim software fix. In an embodiment, the method will continue by making available to the user the electronic package for the second interim software fix, storing information associated with the second software operating problem in the archive, and creating the link between the information associated with the first software operating problem and the information associated with the second software operating problem to advise of the second software operating problem resulting from the first interim software fix, and ensure that any subsequent considerations of use of the first interim software fix include recognition of the potential to create the second software operation problem. In an embodiment, the storing information associated with the second software operating problem in the archive includes storing the electronic package for the second interim software fix, information relating to the corresponding backing tree, the set of source code to remedy the second software operating problem, and a set of identification numbers that allow the second interim software fix to be uniquely identified. In an embodiment, the storing the set of identification numbers include storing "defect numbers", that are used to internally identify the second interim software fix. In an embodiment, storing the set of identification numbers include storing APAR numbers that are available for external use to identify the second interim software fix. In an embodiment, the making available to the user the electronic package for the second interim software fix includes making available, to the plurality of users to whom the electronic software package for the first interim software fix was made available, the electronic software package for the second interim software fix.

In an embodiment, the method further includes determining that the third software operating problem comprises the first software operating problem as well as the additional software operating problem, and developing the set of source code to eliminate, or at least remedy, the additional software operating problem in conjunction with the backing tree that defines the exact version of software used by the user. An embodiment of the method allows for the combining of the set of source code to eliminate, or at least remedy, the additional software operating problem with the stored set of source code to eliminate, or at least remedy, the first software operating problem, thereby developing the third interim software fix for remedying the third software operating problem. In an embodiment, the method proceeds with creating the electronic package for the third interim software fix, making available to the user the electronic package for the third interim software fix, and storing information associated with the third software operating problem in the archive. In an embodiment, the storing information associated with the third software operating problem in the archive includes storing the electronic package for the third interim software fix, information relating to the corresponding backing tree, the set of source code to remedy the third software operating problem, and a set of identification numbers that allow the third interim software fix to be uniquely identified. In an embodiment, the storing the set of identification numbers include storing "defect numbers", that are used to internally identify the third interim software fix. In an embodiment, storing the set of identification numbers include storing APAR numbers that are available for external use to identify the third interim software fix.

As disclosed, some embodiments of the invention may include some of the following advantages: elimination of duplicate work by the software developer; reducing the number of interim fix requests sent to the software developer; the ability to track the interim fixes sent to a plurality of users; increasing the ease to package multiple fixes by storing the source code; and allowing various developers to access and debug any problems with the interim fixes The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A processor implemented method of organizing interim software fixes comprising:
   in response to a user-initiated assistance request, communicating with a user to understand a first software operation problem;

creating a problem management record comprising an identity of the user, information relating to an exact version of a software program experiencing the first software operation problem, and information relating to the first software operation problem;

determining if a first interim software fix to remedy the first software operation problem exists within an archive comprising a plurality of interim software fixes;

in response to determining that the first interim software fix exists, making available to the user an electronic package for installing the first interim software fix to remedy the first software operation problem;

in response to determining that the first interim software fix does not exist, using a backing tree that includes components of multiple releases of versions of the software program experiencing the first software operation problem, selecting and combining the selected components of the multiple releases of versions of the software program to create a duplicate version of the exact version of the software program used by the user, and using the duplicate version of the exact version of the software program used by the user to develop the first interim software fix comprising a set of source code to remedy the first software operation problem;

creating an electronic package for the first interim software fix;

making available to the user the electronic package for the first interim software fix; and storing information associated with the first software operating problem in the archive;

determining that a second software operating problem results from the first interim software fix;

developing a second interim software fix comprising a set of source code to remedy the second software operation problem in conjunction with the backing tree that defines the exact version of software used by the user;

creating an electronic package for the second interim software fix using an archive client among a plurality of archive clients being in electrical communication with the archive;

making available to the user the electronic package for the second interim software fix; storing information associated with the second software operating problem in the archive; and creating a link via the backing tree between the information associated with the first software operating problem and the information associated with the second software operating problem to advise of the second software operating problem resulting from the first interim software fix, the information associated with the first and second software operating problems comprising a backing tree that includes components of multiple release versions of the software program.

2. The method of claim 1 wherein the storing information associated with the second software operating problem in the archive comprises:

storing the electronic package for the second interim software fix, information relating to the corresponding backing tree, the set of source code to remedy the second software operating problem, and a set of identification numbers that allow the second interim software fix to be uniquely identified.

3. The method of claim 1, wherein the making available to the user the electronic package for the second interim software fix comprises:

making available to a plurality of users, to whom the electronic software package for the first interim software fix was made available, the electronic software package for the second interim software fix.

4. The method of claim 1, wherein the storing information associated with the first software operating problem in the archive comprises:

storing the electronic package for the first interim software fix, information relating to the corresponding backing tree, the set of source code to remedy the first software operating problem, and a set of identification numbers that allow the first interim software fix to be uniquely identified.

5. The method of claim 4, further comprising:

determining that a third software operating problem comprises the first software operating problem as well as a second software operating problem;

developing a set of source code to remedy the second software operating problem in conjunction with the backing tree that defines the exact version of software used by the user;

combining the set of source code to remedy the second software operating problem with the stored set of source code to remedy the first software operating problem, thereby developing a third interim software fix for remedying the third software operating problem;

creating an electronic package for the third interim software fix;

making available to the user the electronic package for the third interim software fix; and storing information associated with the third software operating problem in the archive.

6. The method of claim 5, wherein the storing information associated with the third software operating problem in the archive comprises:

storing the electronic package for the third interim software fix, information relating to the corresponding backing tree, the set of source code to remedy the third software operating problem, and a set of identification numbers that allow the third interim software fix to be uniquely identified.

7. A non-transitory program storage device readable by a computer, the device embodying a program or instructions executable by the computer to perform the method of claim 1.

8. A processor implemented method of organizing interim software fixes comprising:

in response to a user-initiated assistance request, communicating with a user to understand a first software operation problem;

creating a problem management record comprising an identity of the user, information relating to an exact version of a software program experiencing the first software operation problem, and information relating to the first software operation problem;

determining if a first interim software fix to remedy the first software operation problem exists within an archive comprising a plurality of interim software fixes;

in response to determining that the first interim software fix exists, making available to the user an electronic package for installing the first interim software fix to remedy the first software operation problem;

in response to determining that the first interim software fix does not exist, using a backing tree that includes components of multiple releases of versions of the software program experiencing the first software operation problem, selecting and combining the selected components of the multiple releases of versions of the software program to create a duplicate version of the exact version of the software program used by the user, and using the duplicate version of the exact version of the software program used by the user to develop the first interim software fix comprising a set of source code to remedy the first software operation problem;

creating an electronic package for the first interim software fix;

making available to the user the electronic package for the first interim software fix;

storing information associated with the first software operating problem in the archive;

determining that a second software operating problem results from the first interim software fix;

developing a second interim software fix comprising a set of source code to remedy the second software operation problem in conjunction with the backing tree that defines the exact version of software used by the user;

creating an electronic package for the second interim software fix;

making available to a plurality of users, to whom the electronic software package for the first interim software fix was made available, the electronic software package for the second interim software fix, the electronic software package of the second interim software fix created using an archive client among a plurality of archive clients being in electrical communication with the archive; storing information associated with the second software operating problem in the archive; and creating a link between the information associated with the first software operating problem and the information associated with the second software operating problem to advise of the second software operating problem resulting from the first interim software fix the information associated with the first and second software operating problems comprising a backing tree that includes components of multiple release versions of the software program.

9. The method of claim 1, wherein the stored information associated with the first software operating problem includes the electronic package for installing first interim software fix, data from the backing tree associated with the first interim software fix, the set of source code to remedy the first software operation problem, and a set of identification numbers that uniquely identifies the first interim software fix.

10. The method of claim 8, wherein the stored information associated with the first software operating problem includes the electronic package for installing first interim software fix, data from the backing tree associated with the first interim software fix, the set of source code to remedy the first software operation problem, and a set of identification numbers that uniquely identifies the first interim software fix.

\* \* \* \* \*